Figure 1:
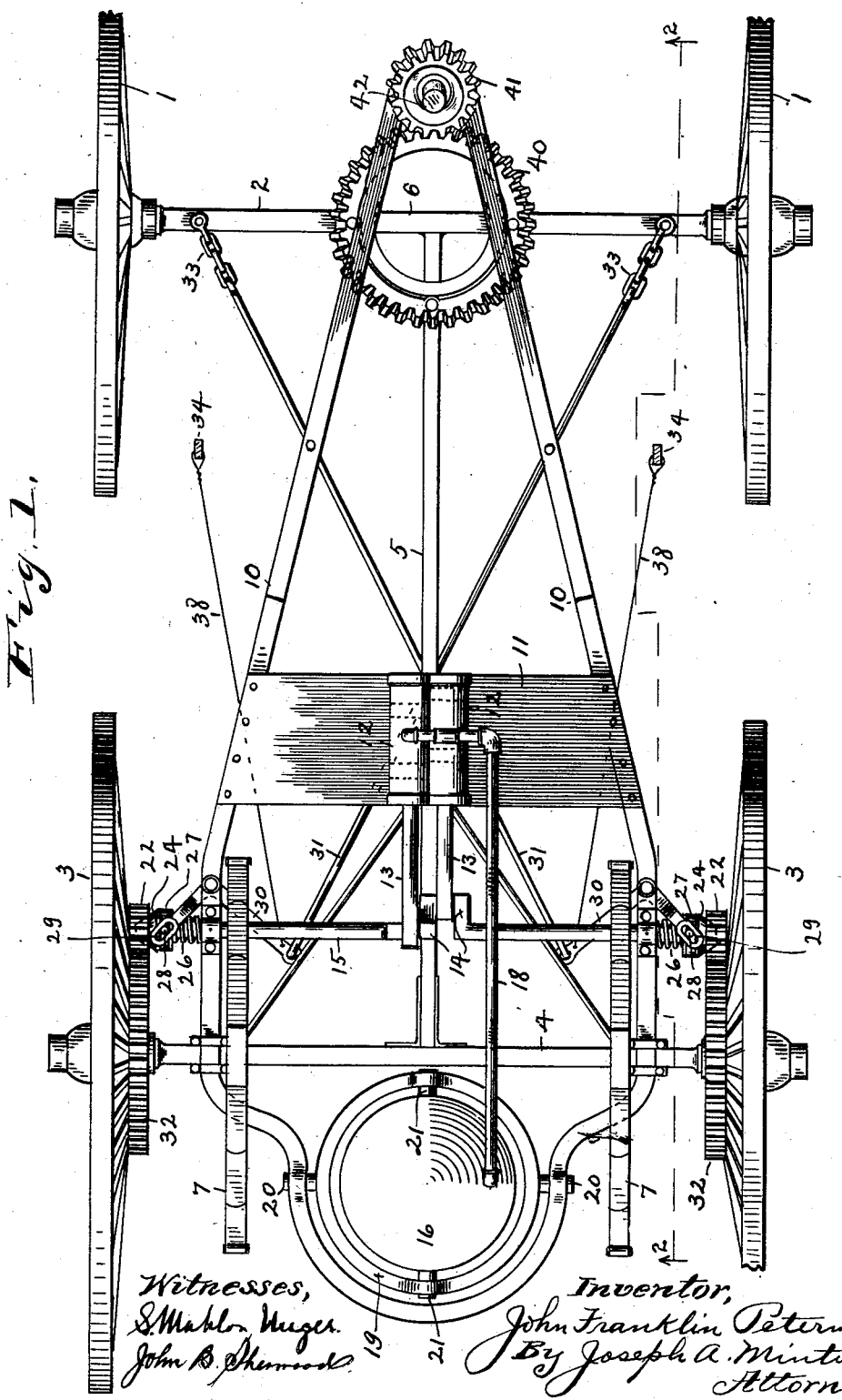

No. 703,459. Patented July 1, 1902.
J. F. PETERMAN.
AUTOMOBILE ATTACHMENT FOR VEHICLES.
(Application filed Sept. 3, 1901.)
(No Model.) 2 Sheets—Sheet 1.

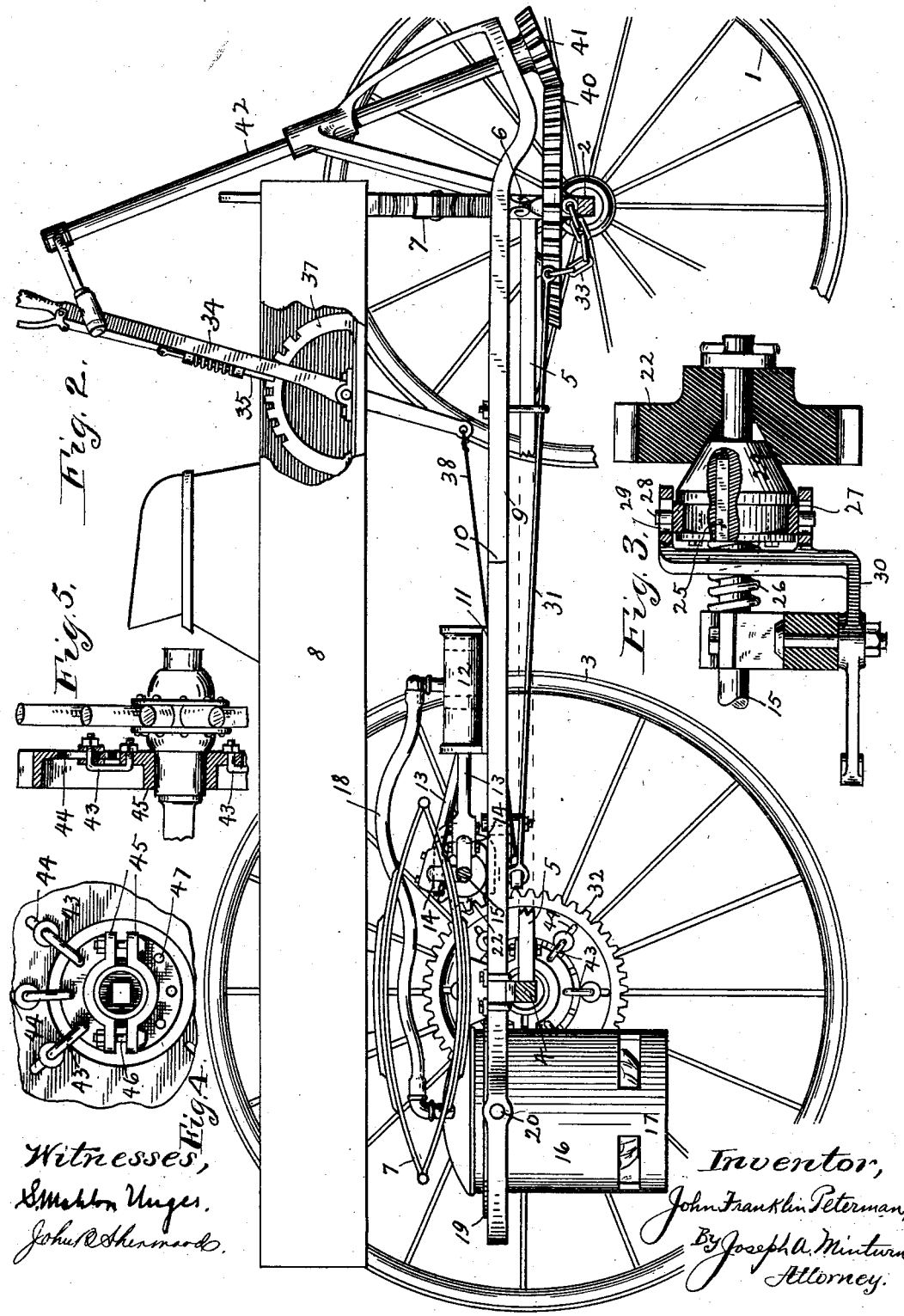

UNITED STATES PATENT OFFICE.

JOHN FRANKLIN PETERMAN, OF INDIANAPOLIS, INDIANA.

AUTOMOBILE ATTACHMENT FOR VEHICLES.

SPECIFICATION forming part of Letters Patent No. 703,459, dated July 1, 1902.

Application filed September 3, 1901. Serial No. 74,166. (No model.)

*To all whom it may concern:*

Be it known that I, JOHN FRANKLIN PETERMAN, a citizen of the United States, residing at Indianapolis, in the county of Marion and State of Indiana, have invented certain new and useful Improvements in Automobile Attachments for Vehicles, of which the following is a specification.

The object of this invention is to provide a motor attachment to be applied to ordinary vehicles as a substitute for animal power; to provide means, where the driving-wheels revolve on their axle, of automatically disconnecting the inner wheel when the vehicle is turning a curve or of permitting of a variation in speed between the two wheels; of attaching the motor mechanism to the running-gear of the vehicle and not to the bed or body of the vehicle, so as to avoid the necessity of variable connections, which would be required between a spring-supported body and the driving-wheels because of the constantly-varying distances.

The object also is to support a steam-generating boiler in a manner that will cause it by gravity to maintain a vertical position regardless of a tilted position of the vehicle, as when the latter is passing over uneven roads; and a further object is to provide a construction that will be simple, durable, and inexpensive to manufacture and to keep in repair.

I accomplish the objects of the invention by the mechanism illustrated in the accompanying drawings, in which—

Figure 1 is a top or plan view of a vehicle with the body or bed removed to show my improvements attached to the running-gear below; Fig. 2, a vertical section on the dotted line 2 2 of Fig. 1, showing the bed of the vehicle in place and broken away in part; Fig. 3, a detail showing pinion on driving-shaft in section and showing friction-cone operating therewith and mechanism for controlling the position of the cone; Fig. 4, a detail of the web of large driving gear-wheel, showing manner of attaching it to clamp and construction and use of clamp; and Fig. 5 is a detail in vertical section of large gear-wheel and clamp, showing same applied to hub of a wheel.

Like numbers of reference indicate like parts throughout the several views of the drawings.

1 1 are the front wheels; 2, their axle; 3 3, the rear wheels; 4, their axle; 5, the reach connecting the rear axle 4 with the head-block 6; 7, the elliptic springs, and 8 the body of a light spring-wagon of common form. Any one of the many well-known varieties or styles of four-wheeled vehicles commonly drawn by horses may be used instead of the style here shown.

9 is a frame, preferably made out of bar-iron and shaped as shown in Fig. 1. It rests upon the rear axle and upon the head-block in front, and upon this frame the power-generating mechanism is mounted. This frame is shown in Fig. 3 as a square bar of iron, solid in cross-section; but obviously it may be angle-iron, tubing, or other different material in cross-section, and preferably it will be jointed together at 10 10 on the two opposite sides thereof to permit adjustment in length to fit different-sized vehicles.

Supported by the frame 9 is the platform 11, upon which is mounted a pair of cylinders 12 12, in each of which work double pistons, (shown in dotted lines,) which are connected by rods 13 13 with the cranks 14 14 on the driving-shaft 15. The cranks are set quartering, so as to avoid a dead-center, and the two engines are used for that same reason. The engines are of the well-known duplex type and need not be described here, and these are used in preference to other styles of engines because of their compactness; but it is not desired to limit the invention to that kind of engine.

16 is the boiler in which steam to drive the engine is generated. It is preferably heated by means of an oil-burner located in the base 17. The boiler is connected by the flexible hose 18 with the cylinders, as shown.

In order to maintain the boiler in a vertical position under all positions of the supporting-vehicle, I project the frame back of the rear axle in the shape shown and mount the ring 19 therein by pivotally securing it at two diametrically opposite sides by means of the pivots 20 20, and within this ring I pivotally suspend the boiler by means of the pivots 21 21, which are diametrically opposite each other and in a plane at right angles to that of the pivots 20. This method of suspension of the boiler permits of its constant vertical position, which as it is suspended from near its upper end it will assume by gravity and maintain because of its free suspension.

Mounted on each end of the driving-shaft 15 are the small toothed wheels 22 22. They are loosely mounted on the shaft, but are made to revolve with the shaft by means of the cones 24, which are feathered to the shaft, as shown at 25 in Fig. 3, and when pressed by the spring 26 take into a conical socket in the hub of the adjacent wheel 15. A cylindrical extension of the cone has a circumferential groove in which is seated a ring 27, having pins 28, which take into slots 29 of the forked end of the bell-crank 30. The inner end of the bell-crank is connected by rod 31 with the front axle between the fifth-wheel and front wheel of the vehicle, on the opposite side from that on which the bell-crank is located. The teeth of the wheels 15 mesh with the cogs of the spur gear-wheel 32, connected rigidly to the spokes or hub of the rear wheels of the vehicle, and when the driving-shaft is rotating with its cones in the sockets of the pinions the vehicle will be propelled in a straight forward direction or to the rear when the rotation of the shaft is reversed.

In turning corners and curves, where the outer wheel must travel farther and faster than the inner wheel, the bell-crank and rod connection of cone with the front axle draws the cone out of its seat or lessens the friction, so as to allow the cone to slip in the socket of the pinion, in either case allowing the inner wheel to travel slower.

In order that the cones will not be withdrawn by the vehicle passing over uneven places in the road, I provide a flexible connection between the connecting-rod 31 and the axle or introduce it somewhere in the connection. This may be a spring, a cable, a chain, or the like. The drawings show a chain 33.

In order to disconnect the vehicle-wheels, either one or both of those in the rear, from the driving-shaft, I provide the two hand-levers 34 34, which project up within reach of the driver and which are held by spring-dog 35 engaging notched segments 37. The lower ends of these levers are connected by cords 38 with the bell-cranks, and by setting the levers the desired disengagement of the rear vehicle-wheels will be obtained.

To steer the vehicle, the large toothed wheel 40 is fastened to the front axle outside of the fifth-wheel and is engaged and turned by toothed wheel 41 on the end of the crank-shaft 42. The handles of the crank-shaft are within easy reach of the driver seated in the vehicle, and in order to bring the handles back in convenient reach I prefer to place the crank-shaft at an angle, as shown.

The cogged wheel or ring 32 has a central opening large enough to allow it to be placed over the hub of the wheel, with space enough between the ring and the hub for the clamping-plates 45, which are bolted to the hub by the bolts 46. The web of the ring 32 has radial slots 44 to receive one end of the U-shaped bolts 43, and the inner ends of the bolts 43 are passed through holes 47 in flanges of the clamps 45. By this means the ring can be set central with the wheel 3.

Having thus fully described my invention, what I claim as new, and wish to secure by Letters Patent, is—

1. The combination with a four-wheeled vehicle of the kind commonly drawn by horses having wheels revolubly mounted on fixed axles, a fifth-wheel, a head-block and a reach connecting the head-block with the rear axle, of a motor attachment comprising a frame removably secured to the head-block and rear axle, an engine mounted on said frame, a shaft driven by said engine, a cogged ring adjustably attached to the rear wheels of the vehicle by means of U-shaped bolts taking into openings in a flange clamped to the hubs of said wheels and into radial slots in the web of the ring, toothed wheels on the ends of the said shaft meshing with the teeth of the rings on the vehicle-wheels and means connected with the front axle of the vehicle for disconnecting the shaft from its toothed wheel on the inner side of the vehicle when the vehicle is traveling in a curve.

2. In a motor attachment for vehicles, a frame adapted to rest on the head-block of the vehicle in front and on the rear axle of the vehicle, a motor supported by the frame, a shaft driven by the motor having cogged wheels loosely mounted on either ends thereof, said wheels having conical sockets in their hubs, cones rotating with the shaft and mounted thereon, springs to press the cones into the sockets of the cog-wheels, a bell-crank connected with the cones, a rod connecting the bell-crank with the front axle of the vehicle, flexible links in said rod and cogged rings adjustably secured to the rear driving-wheels meshing with the cogged wheels on the said shaft.

In witness whereof I have hereunto set my hand and seal, at Indianapolis, Indiana, this 23d day of August, A. D. 1901.

JOHN FRANKLIN PETERMAN. [L. S.]

Witnesses:
 JOSEPH A. MINTURN,
 S. MAHLON UNGER.